(12) United States Patent
Oota (10) Patent No.: US 9,982,993 B2
(45) Date of Patent: May 29, 2018

(54) MEASUREMENT APPARATUS AND MEASUREMENT METHOD

(71) Applicant: CANON KABUSHIKI KAISHA, Tokyo (JP)

(72) Inventor: Tetsuji Oota, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 15/363,167

(22) Filed: Nov. 29, 2016

(65) Prior Publication Data

US 2017/0167860 A1    Jun. 15, 2017

(30) Foreign Application Priority Data

Dec. 11, 2015   (JP) ................................ 2015-242646

(51) Int. Cl.
*G01B 11/24*   (2006.01)

(52) U.S. Cl.
CPC .................... *G01B 11/24* (2013.01)

(58) Field of Classification Search
CPC ... G01B 11/24; G01B 11/005; G01B 11/2441; G01B 3/008; G01B 21/04; G01B 5/20
See application file for complete search history.

(56) References Cited

U.S. PATENT DOCUMENTS

| 2009/0024355 | A1* | 1/2009 | Negishi | G01B 3/008 702/168 |
| 2013/0197844 | A1* | 8/2013 | Oota | G01B 11/2441 702/94 |
| 2017/0082521 | A1* | 3/2017 | May | G01M 11/0221 |

FOREIGN PATENT DOCUMENTS

JP    H10-019504 A    1/1998

* cited by examiner

*Primary Examiner* — Dominic J Bologna
(74) *Attorney, Agent, or Firm* — Rossi, Kimms & McDowell LLP (57) ABSTRACT

The present invention provides a measurement apparatus for measuring a shape of a surface of an object, including a probe configured to be scanned on the surface of the object, a plurality of reference members configured to be arranged in a scanning direction of the probe, a plurality of detection units configured to be provided at different positions of the probe in the scanning direction and each configured to detect a distance from a reference member which has been selected from the plurality of reference members in accordance with a position of the probe in the scanning direction, and a processing unit configured to obtain shape information of the surface of the object by obtaining position information of the probe based on at least one of detection results of the plurality of detection units while scanning the probe.

13 Claims, 8 Drawing Sheets

|  | FIRST RANGE | SECOND RANGE | THIRD RANGE | FOURTH RANGE | FIFTH RANGE |
|---|---|---|---|---|---|
| FIRST DETECTION UNIT | ○ | ○ | ○ | × | ○ |
| SECOND DETECTION UNIT | ○ | × | ○ | ○ | ○ |

MEASUREMENT APPARATUS AND MEASUREMENT METHOD

BACKGROUND OF THE INVENTION

Field of the Invention

The present invention relates to a measurement apparatus for measuring the shape of the surface of an object, and a measurement method.

Description of the Related Art

As disclosed in Japanese Patent Laid-Open No. 10-19504, there is known a measurement apparatus for measuring the shape of the surface of an object by scanning a probe on the surface of the object. Such measurement apparatus can measure the shape of the surface of the object by, for example, providing a reference member, and detecting the distance between the reference member and the probe while scanning the probe on the surface of the object.

In recent years, along with an increase in size of the surface of the object, it has been necessary to enlarge the scanning range of the probe in the measurement apparatus. As a method of enlarging the scanning range of the probe, for example, there is provided a method of arranging a plurality of reference members in the scanning direction of the probe. If, however, a plurality of reference members are used, a reference member whose distance to the probe is to be detected is changed depending on scanning of the probe. Consequently, it is difficult to accurately measure the shape of the surface of the object. For example, the measurement result of the shape of the surface of the object becomes discontinuous between the plurality of reference members.

SUMMARY OF THE INVENTION

The present invention provides a technique advantageous in accurately measuring the shape of the surface of an object.

According to one aspect of the present invention, there is provided a measurement apparatus for measuring a shape of a surface of an object, including a probe configured to be scanned on the surface of the object, a plurality of reference members configured to be arranged in a scanning direction of the probe, a plurality of detection units configured to be provided at different positions of the probe in the scanning direction and each configured to detect a distance from a reference member which has been selected from the plurality of reference members in accordance with a position of the probe in the scanning direction, and a processing unit configured to obtain shape information of the surface of the object by obtaining position information of the probe based on at least one of detection results of the plurality of detection units while scanning the probe, wherein the processing unit changes the detection result to be used to obtain the position information among the detection results of the plurality of detection units in accordance with a range within which the probe is arranged, among a plurality of ranges obtained by partitioning a scanning range of the probe in the scanning direction, and a combination of reference members respectively selected for the plurality of detection units is different in each of the plurality of ranges.

Further aspects of the present invention will become apparent from the following description of exemplary embodiments with reference to the attached drawings.

DESCRIPTION OF THE EMBODIMENTS

Preferred embodiments of the present invention will be described below with reference to the accompanying drawings. Note that the same reference numerals denote the same members throughout the drawings, and a repetitive description thereof will not be given.

First Embodiment

Figure 1A:
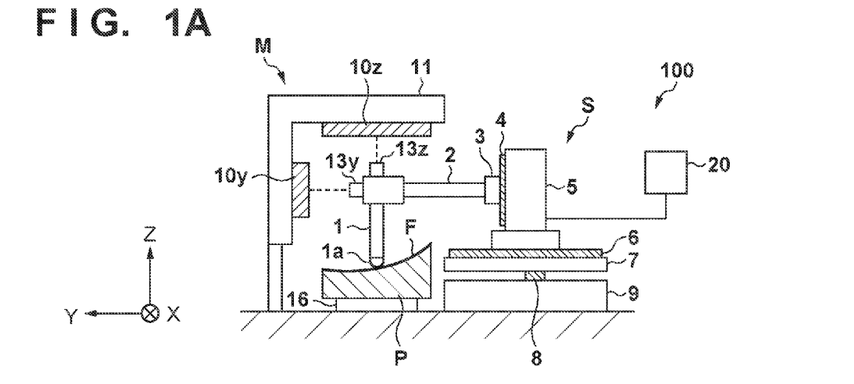
FIGS. 1A to 1C are schematic views each showing the arrangement of a measurement apparatus according to the first embodiment.
Figure 1B:
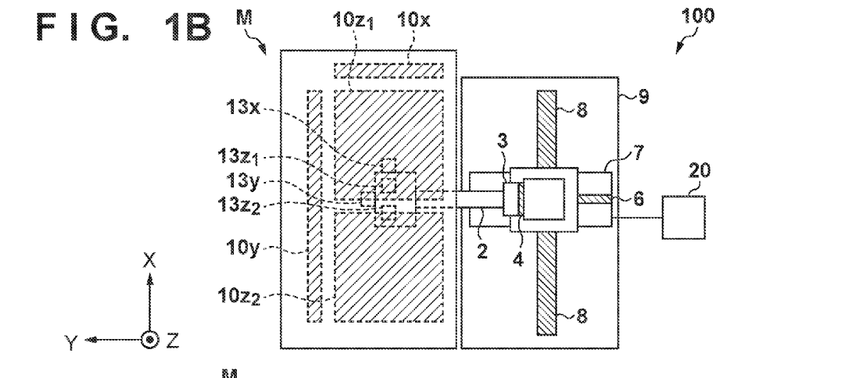
Figure 1C:
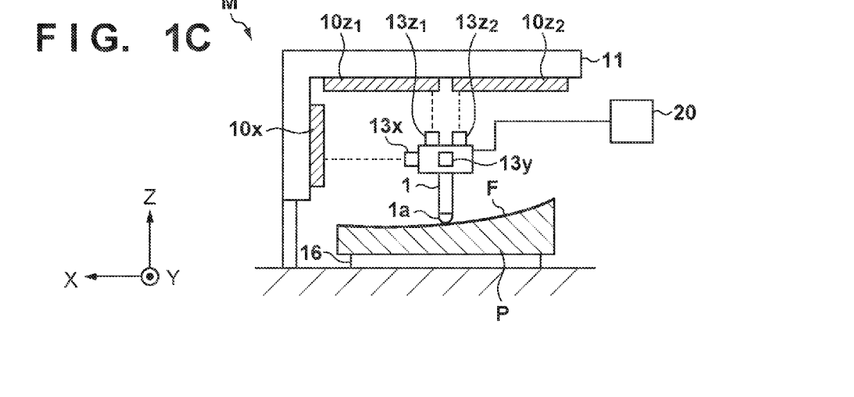

A measurement apparatus 100 according to the first embodiment of the present invention will be described. FIGS. 1A to 1C are schematic views each showing the arrangement of the measurement apparatus 100 according to the first embodiment. FIGS. 1A, 1B, and 1C are views respectively showing the measurement apparatus 100 when viewed from the X, Y, and Z directions. Note that for the sake of easy understanding of the apparatus arrangement, FIG. 1B shows a probe 1 and a plurality of detection units 13 in addition to a plurality of reference members 10 (a frame M).

The measurement apparatus 100 can include, for example, the probe 1 with a probe sphere 1a, a driving unit S for driving the probe 1, the frame M with the plurality of reference members 10, a measurement stage 16 on which an object P is mounted, and a processing unit 20. In the measurement apparatus 100, the plurality of detection units 13 respectively for detecting the distances from the reference members 10 are provided in the probe 1. The measurement apparatus 100 scans the probe 1 by the driving unit S while keeping the probe sphere 1a in contact with a surface F of the object, and obtains the position information of the probe 1 based on at least one of the detection results of the plurality of detection units 13 during scanning. This allows the measurement apparatus 100 to measure the shape of the surface F of the object.

The driving unit S can include, for example, a support unit 2 for supporting the probe 1, a Z stage 3, a Z actuator 4, a Y stage 5, a Y actuator 6, an X stage 7, an X actuator 8, and a stage base 9. The Z actuator 4 is supported by the Y stage 5, and drives the Z stage 3 connected to the support unit 2 in the Z direction (that is, the probe 1 in the Z direction). The Y actuator 6 is supported by the X stage 7, and drives the Y stage 5 in the Y direction (that is, the probe 1 in the Y direction). The X actuator 8 is supported by the stage base 9, and drives the X stage 7 in the X direction (that is, the probe 1 in the X direction).

The frame M can include, for example, the plurality of reference members 10 serving as references for obtaining the position information of the probe 1, and a support member 11 for supporting the plurality of reference members 10. The plurality of reference members 10 can include, for example, Z reference members 10z (a first reference member $10z_1$ and a second reference member $10z_2$) arranged on the Z-direction side of the probe 1, a Y reference member 10y arranged on the Y-direction side of the probe 1, and an X reference member 10x arranged on the X-direction side of the probe 1. The first reference member $10z_1$ and the second reference member $10z_2$ are arranged side by side in the scanning direction (for example, the X direction (first direction)) of the probe 1. Each reference member 10 is formed by, for example, a mirror member, and includes a reference surface (a reflecting surface which reflects light). The first reference member $10z_1$ and the second reference member $10z_2$ can be (separated and) arranged to have a gap gm in the X direction. The reason why the gap gm is provided is to prevent the first reference member $10z_1$ and the second reference member $10z_2$ from interfering with each other due to a vibration of the frame M, thermal expansion of the reference members 10, assembly errors of the reference members 10 with the frame M, or the like.

The plurality of detection units 13 include, for example, a plurality of Z detection units 13z, a Y detection unit 13y, and an X detection unit 13x, and are respectively attached to the probe 1. The plurality of Z detection units 13z are provided at different positions of the probe 1 in the scanning direction (for example, the X direction (first direction)) (for example, to be arranged side by side in the X direction), and can include a first detection unit $13z_1$ and a second detection unit $13z_2$. Each of the plurality of Z detection units 13z detects the distance from the Z reference member 10z which has been selected from the plurality of Z reference members 10z in accordance with the position of the probe 1 in the X direction. For example, each of the plurality of Z detection units 13z emits light in the Z direction, and detects the distance from one of the plurality of Z reference members 10z, which is irradiated with the light in accordance with the position of the probe 1 in the X direction. The Y detection unit 13y detects the distance from the Y reference member 10y using light emitted in the Y direction. The X detection unit 13x detects the distance from the X reference member 10x using light emitted in the X direction. Each detection unit 13 can be formed by, for example, a laser interferometer.

The first detection unit $13z_1$ and the second detection unit $13z_2$ are arranged so that a spacing gi between optical axes in the X direction (first direction) is wider than the gap gm in the X direction between the first reference member $10z_1$ and the second reference member $10z_2$. This makes it possible to select one of the plurality of Z reference members 10z with respect to at least one of the plurality of Z detection units 13z while scanning the probe 1 in the X direction. That is, one (the first reference member $10z_1$ or the second reference member $10z_2$) of the plurality of Z reference members 10z can be irradiated with light emitted from at least one of the plurality of Z detection units 13z.

The processing unit 20 is formed by, for example, a computer including a CPU and a memory, and performs processing of obtaining information (shape information) indicating the shape of the surface F of the object. For example, the processing unit 20 can obtain the shape information of the surface F of the object by obtaining the position information of the probe based on at least one of the detection results of the plurality of Z detection units 13z while scanning the probe 1 on the surface of the object by the driving unit S. In the measurement apparatus 100 according to the first embodiment, the processing unit 20 can be configured to have a function as a control unit for controlling the respective units of the measurement apparatus 100. However, the present invention is not limited to this, and a control unit may be provided separately from the processing unit 20.

The measurement stage 16 on which the object P is mounted can include, for example, a force sensor. This allows the processing unit 20 to control the driving unit S so that a force applied to the surface F of the object from the probe 1 becomes constant when scanning the probe 1 on the surface of the object while keeping the probe sphere 1a in contact with the surface F of the object. The measurement stage 16 may be configured to drive the object P in the X and Y directions to change the position (X and Y directions) of the surface F of the object with respect to the frame M (the plurality of reference members 10). That is, the measurement stage 16 may be configured to include an actuator for driving the object in the X and Y directions.

In the measurement apparatus 100 with the above arrangement, the Z reference member 10z serving as a reference for detecting the position of the probe 1 in the Z direction is changed in accordance with scanning of the probe 1 in the X direction. To cope with this, the processing unit 20 changes the detection result to be used to obtain the position information of the probe 1 among the detection results of the plurality of Z detection units 13z in accordance with a range within which the probe 1 is arranged, among a plurality of ranges obtained by partitioning the scanning range of the probe 1.

Figure 2A:
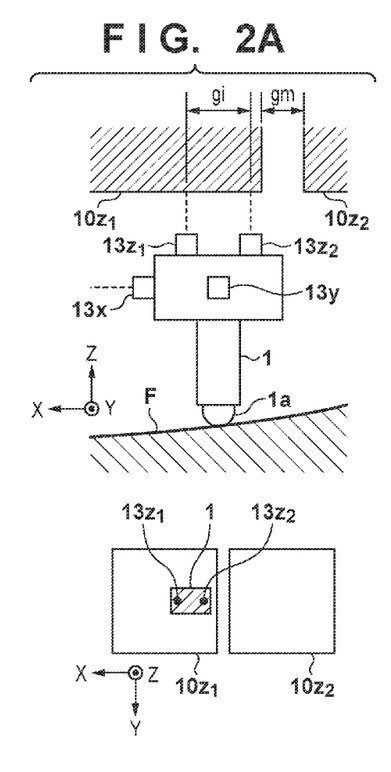
FIGS. 2A to 2C are views each showing the arrangement relationship between a probe and a plurality of Z reference members.
Figure 2B:
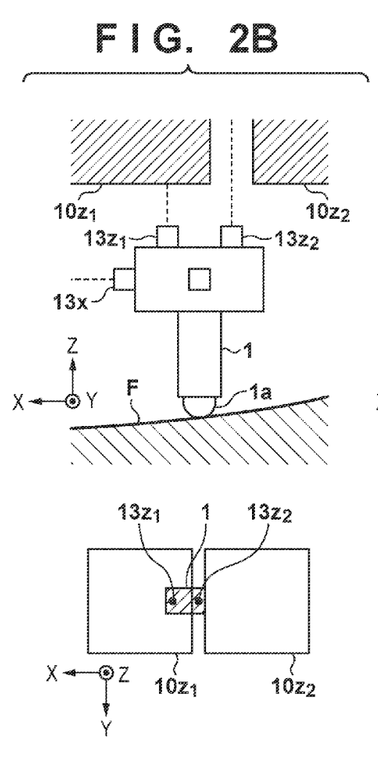
Figure 2C:
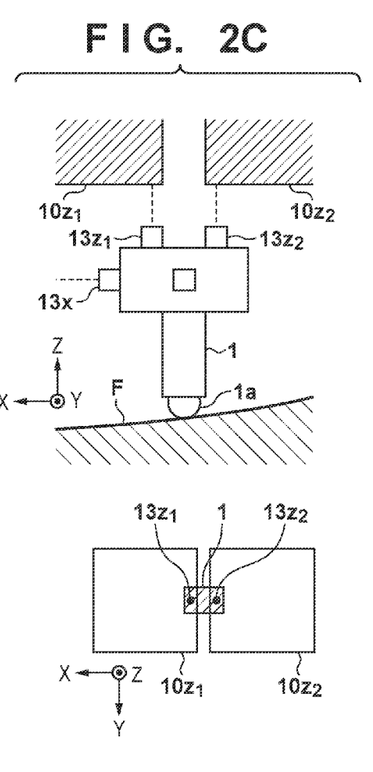
Figure 3:
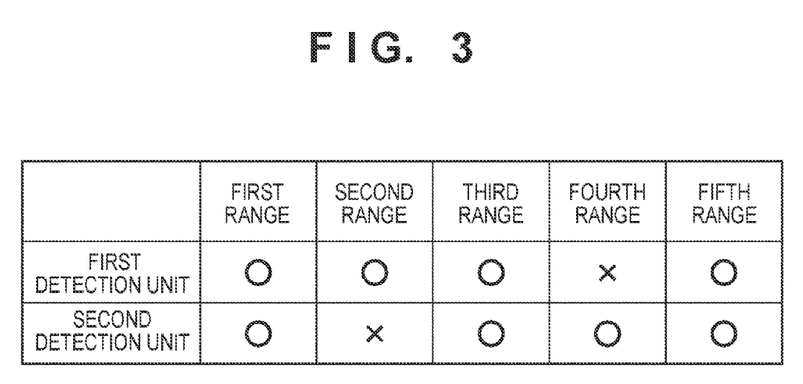
FIG. 3 is a table showing information indicating the relationship between each of a plurality of ranges and a detection unit whose detection result is used.

A measurement method in the measurement apparatus 100 according to the first embodiment will be described with reference to FIGS. 2A to 2C and 3. FIGS. 2A to 2C are views each showing the arrangement relationship between the probe 1 and the plurality of Z reference members 10z (the first reference member $10z_1$ and the second reference member $10z_2$). FIG. 3 is a table showing information indicating the relationship between each of the plurality of ranges and the Z detection unit 13z whose detection result is used. The plurality of ranges obtained by partitioning the scanning range of the probe 1 are set to be different in combination of the Z reference members 10z selected for the respective Z detection units 13z, that is, combination of the Z reference members 10z irradiated with light beams from the respective Z detection units 13z. For example, in the first embodiment, the plurality of ranges are set to be different in combination of the Z reference member 10z selected for the first detection unit $13z_1$ and the Z reference member 10z selected for the second detection unit $13z_2$ among the plurality of Z reference members 10z.

FIG. 2A is a view showing a state in which the probe 1 is arranged within the first range of the plurality of ranges obtained by partitioning the scanning range of the probe 1. In FIG. 2A, an upper view shows the measurement apparatus 100 when viewed from the Y direction, and a lower view shows the measurement apparatus 100 when viewed from the Z direction. The first range is a range within which the same reference member 10z is selected for each of the plurality of Z detection units 13z, that is, a range within which the same reference member 10z is irradiated with light from each of the plurality of Z detection units 13z. In the first range in the first embodiment, the first reference member $10z_1$ is irradiated with light from the first detection unit $13z_1$ and light from the second detection unit $13z_2$. Therefore, in the first range, the processing unit 20 obtains the position information of the probe 1 using both the detection results of the first detection unit $13z_1$ and second detection unit $13z_2$ based on the information shown in FIG.

3. For example, in the first range, the processing unit 20 obtains the average value of the detection results of the first detection unit $13z_1$ and second detection unit $13z_2$, and then obtains the position information of the probe 1 based on the obtained average value.

FIG. 2B is a view showing a state in which the probe 1 is arranged within the second range of the plurality of ranges obtained by partitioning the scanning range of the probe 1. In FIG. 2B, an upper view shows the measurement apparatus 100 when viewed from the Y direction, and a lower view shows the measurement apparatus 100 when viewed from the Z direction. The second range is a range within which none of the Z reference members 10z are selected for at least one of the plurality of Z detection units 13z, that is, a range within which none of the Z reference members 10z are irradiated with light from at least one of the Z detection units 13z. In the second range in the first embodiment, the first reference member $10z_1$ is irradiated with light from the first detection unit $13z_1$ but none of the Z reference members 10z are irradiated with light from the second detection unit $13z_2$. Therefore, in the second range, the processing unit 20 obtains the position information of the probe 1 using only the detection result of the first detection unit $13z_1$ based on the information shown in FIG. 3.

FIG. 2C is a view showing a state in which the probe 1 is arranged within the third range of the plurality of ranges obtained by partitioning the scanning range of the probe 1. In FIG. 2C, an upper view shows the measurement apparatus 100 when viewed from the Y direction, and a lower view shows the measurement apparatus 100 when viewed from the Z direction. The third range is a range within which the different Z reference members 10z are selected for at least two of the plurality of Z detection units 13z, that is, a range within which the different Z reference members 10z are irradiated with light beams from at least two of the Z detection units 13z. In the third range in the first embodiment, the first reference member $10z_1$ is irradiated with light from the first detection unit $13z_1$, and the second reference member $10z_2$ is irradiated with light from the second detection unit $13z_2$. Therefore, in the third range, the processing unit 20 obtains the position information of the probe 1 using the detection results of the first detection unit $13z_1$ and second detection unit $13z_2$ based on the information shown in FIG. 3. For example, in the third range, the processing unit 20 obtains the average value of the detection results of the first detection unit $13z_1$ and second detection unit $13z_2$, and then obtains the position information of the probe 1 based on the obtained average value. In the third range, since the selected Z reference members 10z are the first detection unit $13z_1$ and the second detection unit $13z_2$ which are different from each other, the processing unit 20 may obtain the position information of the probe 1 based on the weighted average value of the detection results of the first detection unit $13z_1$ and second detection unit $13z_2$. Alternatively, the processing unit 20 may obtain the position information of the probe 1 using only one of the detection results of the detection results of the first detection unit $13z_1$ and second detection unit $13z_2$.

If the probe 1 is further scanned in the X direction in the state in which the probe 1 is arranged within the third range, the probe 1 is arranged within the fourth range although not shown. The fourth range in the first embodiment is a range within which the second reference member $10z_2$ is irradiated with light from the second detection unit $13z_2$ but none of the Z reference members 10z are irradiated with light from the first detection unit $13z_1$. Therefore, in the fourth range, the processing unit 20 obtains the position information of the probe 1 using only the detection result of the second detection unit $13z_2$ based on the information shown in FIG. 3.

If the probe 1 is further scanned in the X direction in the state in which the probe 1 is arranged within the fourth range, the probe 1 is arranged within the fifth range although not shown. The fifth range is a range within which the second reference member $10z_2$ is irradiated with light from the first detection unit $13z_1$ and light from the second detection unit $13z_2$. Therefore, in the fifth range, the processing unit 20 obtains the position information of the probe 1 using the detection results of the first detection unit $13z_1$ and second detection unit $13z_2$ based on the information shown in FIG. 3. For example, in the fifth range, the processing unit 20 obtains the average value of the detection results of the first detection unit $13z_1$ and second detection unit $13z_2$, and then obtains the position information of the probe 1 based on the obtained average value.

As described above, the measurement apparatus 100 according to the first embodiment changes the detection result to be used to obtain the position information of the probe 1 in accordance with the range within which the probe 1 is arranged, among the plurality of ranges obtained by partitioning the scanning range of the probe 1. This can reduce discontinuity in the measurement result of the surface F of the object between the plurality of Z reference members 10z, thereby accurately measuring the shape of the surface F of the object. The first embodiment has explained the example in which the plurality of Z reference members 10z are used. However, the above-described method can be similarly used when a plurality of X reference members 10x are used or when a plurality of Y reference members 10y are used.

Second Embodiment

The first embodiment has explained the example in which the detection result to be used to obtain the position information of the probe 1 is changed in accordance with the range within which the probe 1 is arranged, among the plurality of ranges obtained by partitioning the scanning range of the probe 1. However, each of the plurality of Z reference members 10z may be attached to the support member 11 of the frame M in a tilt state with respect to a target attitude. In this case, the position information of the probe 1 obtained based on the detection results of the plurality of Z detection units 13z may include an error caused by the relative tilt between each of the plurality of Z reference members 10z and the probe 1 or an error caused by the relative tilt between the plurality of Z reference members. That is, in the plurality of ranges, the result of obtaining the position information of the probe 1 may be discontinuous. To cope with this, a processing unit 20 according to the second embodiment corrects the position information of a probe 1 based on information (to be referred to as the first information hereinafter) indicating the relative tilt between each Z reference member 10z and the probe 1 or information (to be referred to as the second information hereinafter) indicating the relative tilt between the plurality of Z reference members 10z. The processing unit 20 then obtains the shape information of a surface F of an object based on the corrected position information of the probe 1.

Figure 4A:
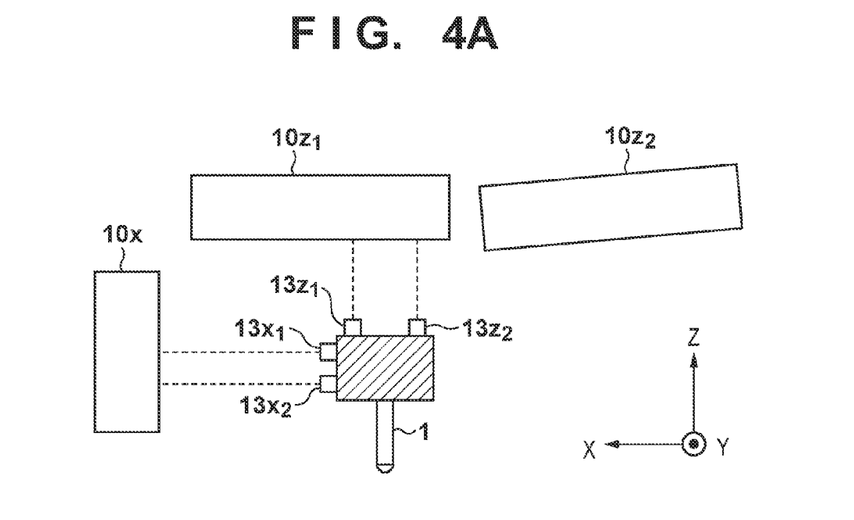
FIGS. 4A and 4B are views each showing a measurement apparatus when viewed from the Y direction.
Figure 4B:
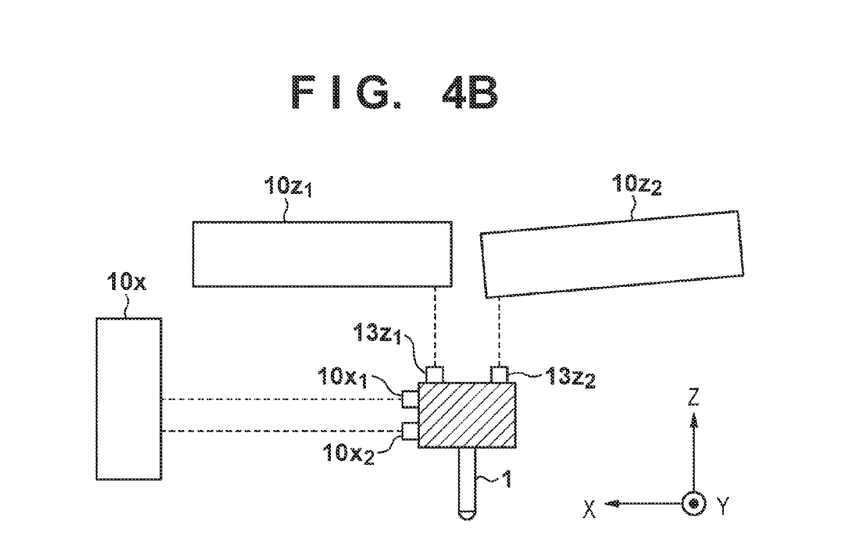

A method of correcting the position information of the probe 1 based on the first information or the second information will be described below with reference to FIGS. 4A and 4B. FIGS. 4A and 4B are views each showing a measurement apparatus 100 when viewed from the Y direction. In the second embodiment, as shown in FIGS. 4A and 4B, two X detection units $13x_1$ and $13x_2$ are provided as an attitude detection unit for detecting the attitude (the tilt around the Y-axis) of the probe 1. The two X detection units $13x_1$ and $13x_2$ are provided at different positions of the probe 1 in the Z direction (for example, to be arranged side by side in the Z direction), and an X reference member $10x$ is irradiated with light beams from the X detection units.

When correcting the position information of the probe 1 based on the first information, the processing unit 20 corrects, based on the first information, the detection results of at least two Z detection units $13z$ in a state in which the same Z reference member $10z$ is selected, among a plurality of Z detection units $13z$. Then, the processing unit 20 obtains the position information of the probe 1 using the corrected detection results.

The first information can be obtained using the at least two Z detection units $13z$ arranged to be able to select the same Z reference member $10z$ in the state in which the same Z reference member $10z$ is selected for the at least two Z detection units $13z$. For example, based on the detection result of the attitude detection unit (X detection units $13x_1$ and $13x_2$), the processing unit 20 controls the attitude of the probe 1 so that the probe 1 is maintained in a target attitude. Then, as shown in FIG. 4A, the processing unit 20 obtains the detection results of a first detection unit $13z_1$ and a second detection unit $13z_2$ in a state in which a first reference member $10z_1$ is selected. This allows the processing unit 20 to obtain the first information indicating the relative tilt between the first reference member $10z_1$ and the probe 1 controlled in the target attitude. The first information can also be obtained for a second reference member $10z_2$ by the same method.

The processing unit 20 controls the probe 1 in the target attitude based on the detection result of the attitude detection unit when obtaining the first information. The present invention, however, is not limited to this. For example, since a shift with respect to the target attitude of the probe 1 is identified from the detection result of the attitude detection unit, it is possible to obtain, based on the shift, the relative tilt between the first reference member $10z_1$ and the target attitude of the probe 1.

On the other hand, when correcting the position information of the probe 1 based on the second information, the processing unit 20 corrects, based on the second information, the detection results of at least two Z detection units $13z$ in a state in which the different Z reference members $10z$ are selected, among the plurality of Z detection units $13z$. Then, the processing unit 20 obtains the position information of the probe 1 using the corrected detection results.

The second information can be obtained using the at least two Z detection units $13z$ arranged to be able to select the different Z reference members $10z$ in the state in which the different Z reference members $10z$ are selected for the at least two Z detection units $13z$. For example, based on the detection result of the attitude detection unit (X detection units $13x_1$ and $13x_2$), the processing unit 20 controls the attitude of the probe 1 so that the probe 1 is maintained in the target attitude. Then, as shown in FIG. 4B, the processing unit 20 obtains the detection result of the first detection unit $13z_1$ in a state in which the first reference member $10z_1$ is selected and the detection result of the second detection unit $13z_2$ in a state in which the second reference member $10z_2$ is selected. This allows the processing unit 20 to obtain the second information indicating the relative tilt between the first reference member $10z_1$ and the second reference member $10z_2$. This embodiment has explained the example in which the probe 1 is controlled in the target attitude using the two X detection units $13x$. Similarly, the attitude of the probe 1 can be controlled using the Y detection unit $13y$ and the Z detection unit $13z$ in accordance with the plurality of target reference members.

Third Embodiment

In the third embodiment, another method of obtaining the second information will be described. In the third embodiment, a processing unit 20 measures the shape of a predetermined portion on the surface of an object with reference to a first reference member $10z_1$, and obtains the measurement result as the first measurement result. The processing unit 20 moves a surface F of an object in the X direction (first direction) with respect to a plurality of Z reference members $10z$, measures the shape of the same predetermined portion on the surface of the object with reference to a second reference member $10z_2$, and obtains the measurement result as the second measurement result. With this processing, for the predetermined portion on the surface of the object, the first measurement result measured with reference to the first reference member $10z_1$ and the second measurement result measured with reference to the second reference member $10z_2$ are obtained.

The first and second measurement results are results of measuring the same predetermined portion on the surface of the object, and should thus be equal to each other. Therefore, the processing unit 20 can obtain the second information indicating the relative tilt between the first reference member $10z_1$ and the second reference member $10z_2$ based on the first and second measurement results.

Figure 5A:
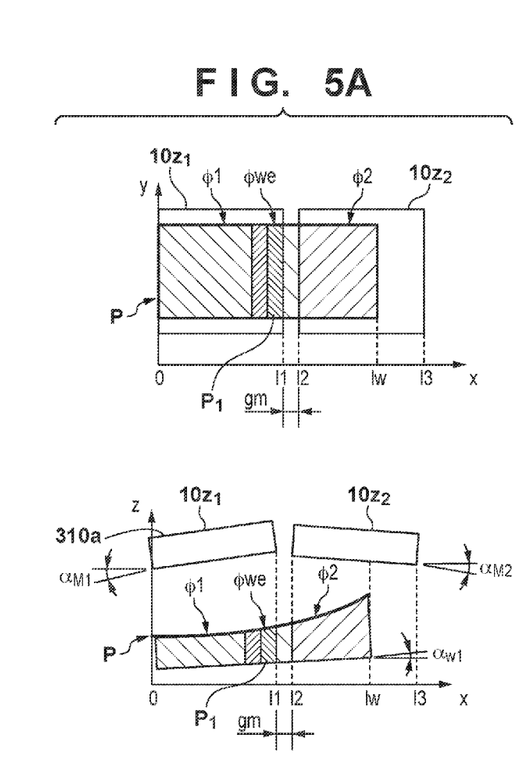
FIGS. 5A and 5B are views for explaining a method of obtaining the second information.
Figure 5B:
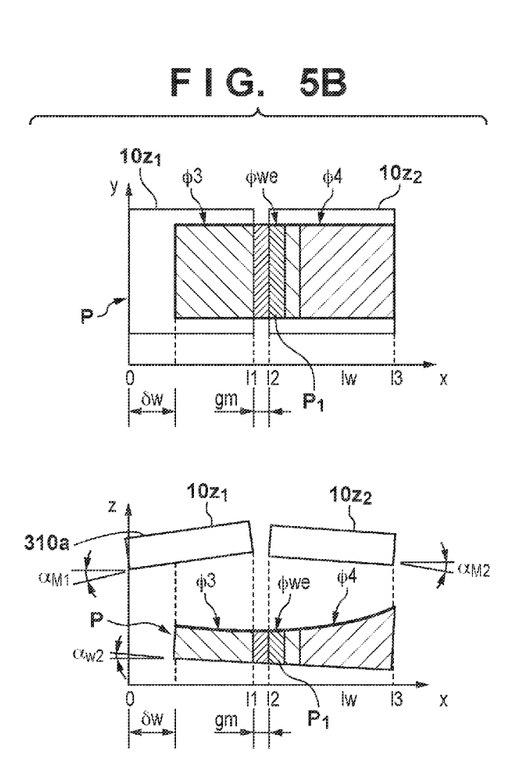

A practical example of the method of obtaining the second information according to the third embodiment will be described below with reference to FIGS. 5A and 5B. FIGS. 5A and 5B are views for explaining the method of obtaining the second information according to the third embodiment. FIGS. 5A and 5B each show the plurality of Z reference members $10z$ and an object P (the surface F of the object), and each show no probe 1 for the sake of simplicity. The shape data of the surface F of the object obtained by scanning the probe 1 on the surface of the object can be represented by $\varphi[x, y]$ as a function of X and Y positions. In this embodiment, for the sake of descriptive simplicity, assuming that the shape data of the surface F of the object is uniform in the Y direction, the shape data is represented by $\varphi[x]$. In the following description, the shape data of the surface F of the object obtained by scanning the probe 1 from a point a to a point b in the X direction is represented by $\varphi[a \to b]$.

First, as shown in FIG. 5A, the processing unit 20 arranges the surface F of the object (the object P) at the first position by a measurement stage 16, and scans the probe 1 on the surface of the object to measure the shape of the surface F of the object (first measurement). In FIG. 5A, an upper view and a lower view respectively show the plurality of Z reference members $10z$ and the object P (the surface F of the object) when viewed from the Z and Y directions. In this case, shape data $\varphi_1$ of a region on the surface of the object measured with reference to the first reference member $10z_1$ and shape data $\varphi_2$ of a region on the surface of the object measured with reference to the second reference member $10z_2$ can be respectively given by:

$$\varphi_1 = \{\varphi_{M1}[0 \to l_1] + \alpha_{M1}x\} + \{\varphi_w[0 \to l_1] + \alpha_{w1}x\} \quad (1)$$

$$\varphi_2 = \{\varphi_{M2}[l_2 \to l_w] + \alpha_{M2}x\} + \{\varphi_w[l_2 \to l_w] + \alpha_{w1}x\} \quad (2)$$

where $\varphi_{M1}$ represents the shape of the first reference member $10z_1$ (reference surface), $\varphi_{M2}$ represents the shape of the second reference member $10z_2$ (reference surface), $\varphi_w$ represents the shape of the surface F of the object, $\alpha_{M1}$ represents the tilt around the Y-axis of the first reference member $10z_1$, $\alpha_{M2}$ represents the tilt around the Y-axis of the second reference member $10z_2$, and $\alpha_{w1}$ represents the tilt of the surface F of the object arranged at the first position.

Next, as shown in FIG. 5B, the processing unit 20 arranges the surface F of the object (the object P) at the second position by the measurement stage 16, and scans the probe 1 on the surface of the object to measure the shape of the surface F of the object (second measurement). In FIG. 5B, an upper view and a lower view respectively show the plurality of Z reference members 10z and the object P (the surface F of the object) when viewed from the Z and Y directions. The second position is a position shifted by a distance $\delta_w$ in the X direction with respect to the first position, and the distance $\delta_w$ is longer than a gap gm between the plurality of Z reference members 10z. In this case, shape data $\varphi_3$ of a region on the surface of the object measured with reference to the first reference member $10z_1$ and shape data $\varphi_4$ of a region on the surface of the object measured with reference to the second reference member $10z_2$ can be respectively given by:

$$\varphi_3=\{\varphi_{M1}[\delta_w \rightarrow l_1]+\alpha_{M1}x\}+\{\varphi_w[0 \rightarrow (l_1-\delta_w)]+\alpha_{w2}x\} \quad (3)$$

$$\varphi_4=\{\varphi_{M1}[l_2 \rightarrow l_3]+\alpha_{M2}x\}+\{\varphi_w[(l_2-\delta_w) \rightarrow l_w]+\alpha_{w2}x\} \quad (4)$$

where $\alpha_{w2}$ represents the tilt of the surface F of the object arranged at the second position.

A predetermined portion $P_1$ on the surface of the object is measured with reference to the first reference member $10z_1$ in the first measurement processing, and measured with reference to the second reference member $10z_2$ in the second measurement processing. Since the shape data of the predetermined portion $P_1$ obtained by the first measurement processing and shape data $\varphi_{we}$ of the predetermined portion $P_1$ obtained by the second measurement processing should be equal to each other, an equation indicating the shape data of the predetermined portion $P_1$ in the first and second measurement processes can be given by:

$$\{\varphi_{M1}[(l_2-\delta_w) \rightarrow l_1]+\alpha_{M1}x\}+\{\varphi_w[(l_2-\delta_w) \rightarrow l_1]+ \alpha_{w1}x\}=\{\varphi_{M2}[l_2 \rightarrow (l_1 30\ \delta_w)]+\alpha_{M2}x\}+\{\varphi_w[l_2 \rightarrow (l_1+\delta_w)]+_{w2}x\} \quad (5)$$

The left-hand side of equation (5) represents the shape data of the predetermined portion $P_1$ obtained by the first measurement processing, and the right-hand side of equation (5) represents the shape data of the predetermined portion $P_1$ obtained by the second measurement processing.

The processing unit 20 can obtain the tilt $\alpha_{M1}$ of the first reference member $10z_1$ and the tilt $\alpha_{M2}$ of the second reference member $10z_2$ by solving simultaneous equations given by equations (1) to (5). That is, the processing unit 20 can obtain the second information indicating the relative tilt between the first reference member $10z_1$ and the second reference member $10z_2$. To solve the simultaneous equations given by equations (1) to (5), it is preferable to obtain in advance measurement values for at least two of the seven parameters. The seven parameters are the shape $\varphi_{M1}$ and tilt $\alpha_{M1}$ of the first reference member $10z_1$, the shape $\varphi_{M2}$ and tilt $\alpha_{M2}$ of the second reference member $10z_2$, the shape $\varphi_w$ of the surface F of the object, and the tilts $\alpha_{w1}$ and $\alpha_{w2}$ of the surface F of the object at the first and second positions. For example, among the seven parameters, the shape $\varphi_{M1}$ of the first reference member $10z_1$ and the shape $\varphi_{M2}$ of the second reference member $10z_2$ are preferably measured in advance, and stored in the apparatus as measurement values.

Fourth Embodiment

Figure 6A:
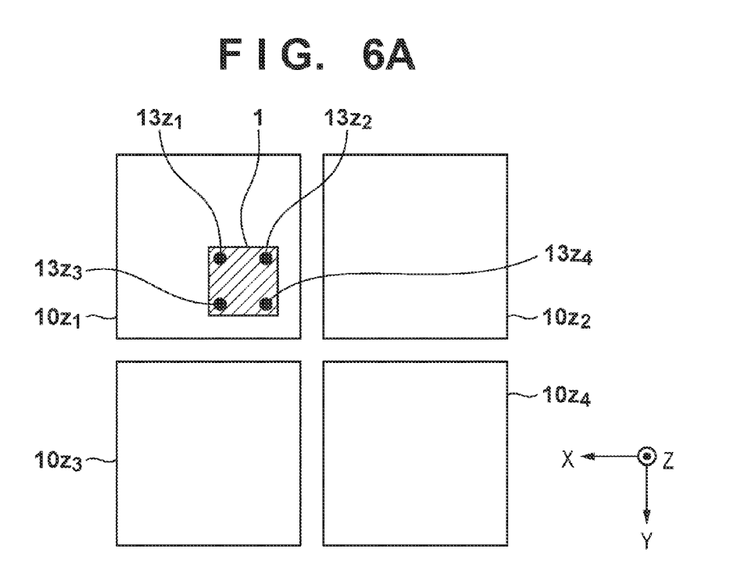
FIGS. 6A and 6B are views each showing a measurement apparatus according to the fourth embodiment when viewed from the Z direction.
Figure 6B:
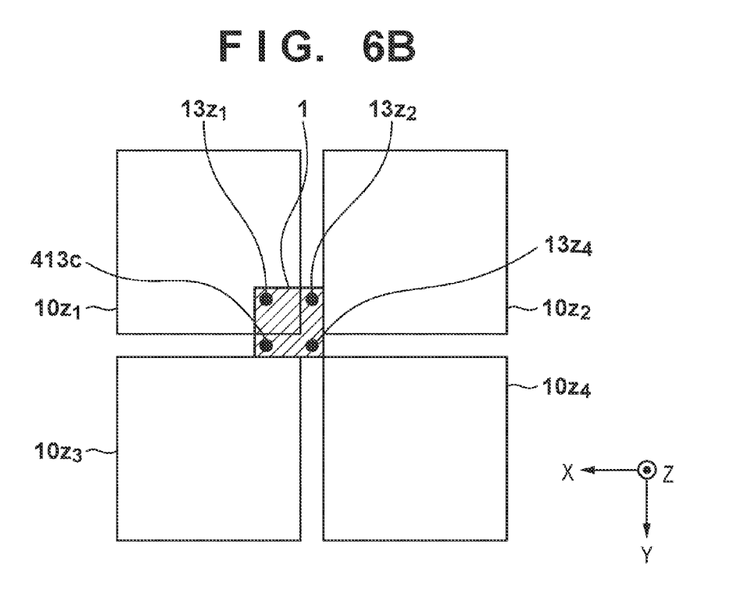

The first embodiment has explained the example in which the two Z reference members 10z arranged side by side in the X direction are used. The number of Z reference members 10z is not limited to two. The fourth embodiment will describe an example in which four Z reference members 10z are used. FIGS. 6A and 6B are views each showing a measurement apparatus according to the fourth embodiment when viewed from the Z direction. FIGS. 6A and 6B each show the plurality of Z reference members 10z and a plurality of Z detection units 13z, and each show no remaining components.

The measurement apparatus according to the fourth embodiment includes four Z reference members $10z_1$ to $10z_4$ and four Z detection units $13z_1$ to $13z_4$. In the measurement apparatus according to the fourth embodiment as well, a processing unit 20 changes a detection result to be used to obtain the position information of a probe 1 among the detection results of the plurality of Z detection units 13z in accordance with a range within which the probe 1 is arranged, among a plurality of ranges obtained by partitioning the scanning range of the probe 1. The plurality of ranges are set to be different in combination of the Z reference members 10z irradiated with light beams from the plurality of Z detection units 13z.

For example, as shown in FIG. 6A, assume that the probe 1 is arranged within a range where the first reference member $10z_1$ is irradiated with light beams from the four Z detection units $13z_1$ to $13z_4$. In this case, the processing unit 20 obtains the position information of the probe 1 using all the detection results of the four Z detection units $13z_1$ to $13z_4$. For example, the processing unit obtains the average value of the detection results of the four detection units $13z_1$ to $13z_4$, and obtains the position information of the probe 1 based on the obtained average value. As shown in FIG. 6B, assume that the probe 1 is arranged within a range where the first reference member $10z_1$ is irradiated with only light from the first detection unit $13z_1$ and none of the Z reference members 10z are irradiated with light beams from the remaining Z detection units $13z_2$ to $13z_4$. In this case, the processing unit 20 obtains the position information of the probe 1 using only the detection result of the first detection unit $13z_1$. At this time, as described in the second or third embodiment, the processing unit 20 may correct the position information of the probe 1 based on at least one of the first information and the second information.

Fifth Embodiment

Figure 7A:
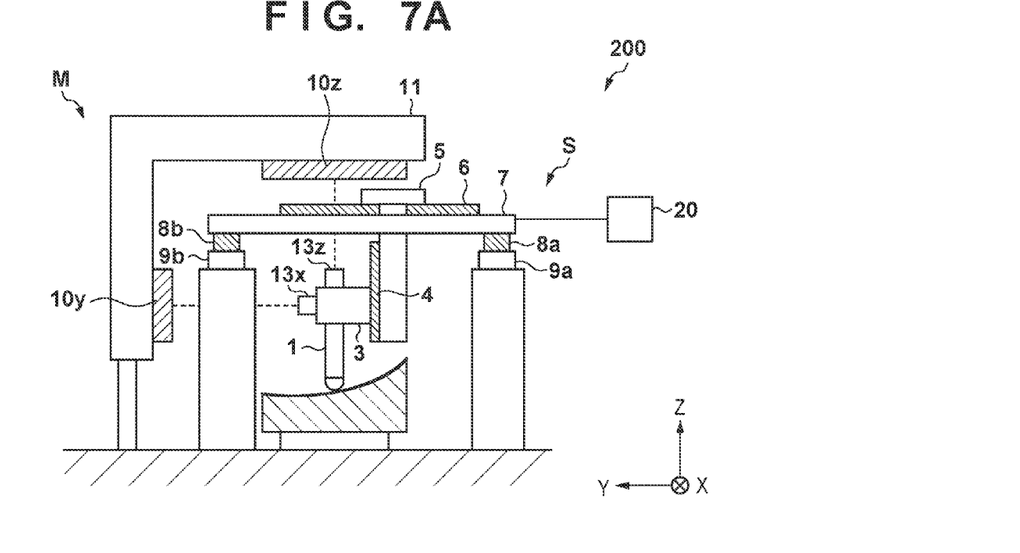
FIGS. 7A and 7B are schematic views each showing a measurement apparatus according to the fifth embodiment.
Figure 7B:
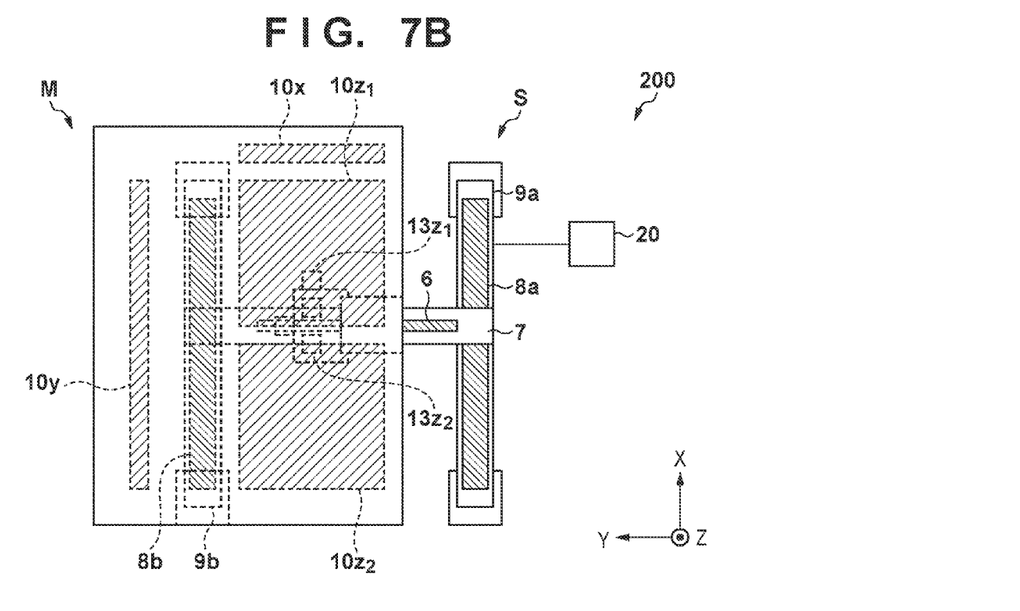

The measurement apparatus 100 according to the first embodiment has the arrangement in which the probe 1 is supported from one side. In this arrangement, however, a vibration generated when moving the probe 1 may be amplified and transferred to the probe 1. To cope with this, the fifth embodiment will describe a measurement apparatus 200 having an arrangement in which a probe 1 is supported from both sides. FIGS. 7A and 7B are schematic views each showing the measurement apparatus 200 according to the fifth embodiment. FIG. 7A shows the measurement apparatus 200 when viewed from the X direction, and FIG. 7B shows the measurement apparatus 200 when viewed from the Z direction. FIG. 7B semi-transparently shows a frame M and a plurality of Z reference members 10z for the sake of easy understanding of the apparatus arrangement. The apparatus arrangement except for a driving unit S is the same as that of the measurement apparatus 100 according to the first embodiment and a description thereof will be omitted.

In the driving unit S of the measurement apparatus 200 according to the fifth embodiment, a Z stage 3 supports the probe 1, and is driven in the Z direction by a Z actuator 4 supported by a Y stage 5. The Y stage 5 is driven in the Y direction by a Y actuator 6 supported by an X stage 7. The X stage 7 is driven in the X direction by a first X actuator 8a supported by a first bridge base 9a and a second X actuator 8b supported by a second bridge base 9b. The first X actuator 8a and the second X actuator 8b are arranged to sandwich an object P in the Y direction.

Sixth Embodiment

Figure 8:
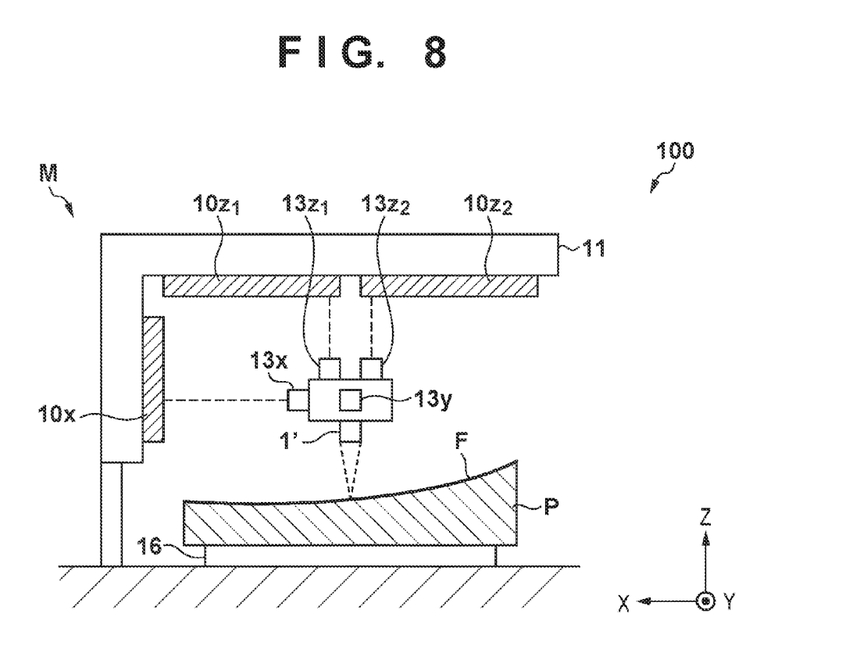
FIG. 8 is a schematic view showing a measurement apparatus according to the sixth embodiment.

The measurement apparatus 100 according to the first embodiment measures the shape of the surface F of the object using the probe 1 (contact type probe) including the probe sphere 1a which contacts the surface F of the object. The present invention, however, is not limited to this. For example, as shown in FIG. 8, the shape of a surface F of an object may be measured using a probe 1' (non-contact type probe) which obtains the distance from the surface F of the object using light in a non-contact manner. The non-contact type probe may adopt a so-called "cat's eye" method for focusing light on the surface of the object, or a method of making light coincide with a curvature at an arbitrary point on the surface of the object. Note that FIG. 8 shows no driving unit S.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-242646 filed on Dec. 11, 2015, which is hereby incorporated by reference herein in its entirety.

What is claimed is:

1. A measurement apparatus for measuring a shape of a surface of an object, comprising:
   a probe configured to be scanned on the surface of the object;
   a plurality of reference members configured to be arranged in a scanning direction of the probe;
   a plurality of detection units configured to be provided at different positions of the probe in the scanning direction and each configured to detect a distance from a reference member which has been selected from the plurality of reference members in accordance with a position of the probe in the scanning direction; and
   a processing unit configured to obtain shape information of the surface of the object by obtaining position information of the probe based on at least one of detection results of the plurality of detection units while scanning the probe,
   wherein the processing unit changes the detection result to be used to obtain the position information among the detection results of the plurality of detection units in accordance with a range within which the probe is arranged, among a plurality of ranges obtained by partitioning a scanning range of the probe in the scanning direction, and
   a combination of reference members respectively selected for the plurality of detection units is different in each of the plurality of ranges.

2. The apparatus according to claim 1, wherein based on information indicating a relationship between each of the plurality of ranges and the detection unit whose detection result is used, the processing unit changes the detection result to be used to obtain the position information among the detection results of the plurality of detection units.

3. The apparatus according to claim 1, wherein the processing unit corrects the position information based on first information indicating a relative tilt between each of the plurality of reference members and the probe, and obtains the shape information based on the corrected position information.

4. The apparatus according to claim 3, wherein
   the plurality of detection units comprise a plurality of first detection units arranged to be able to select the same reference member from the plurality of reference members, and
   the processing unit obtains the first information based on detection results of the plurality of first detection units in a state in which the same reference member is selected from the plurality of reference members.

5. The apparatus according to claim 1, wherein the processing unit corrects the position information based on second information indicating a relative tilt between the plurality of reference members, and obtains the shape information based on the corrected position information.

6. The apparatus according to claim 5, wherein
   the plurality of detection units comprise a plurality of second detection units arranged to be able to select different reference members from the plurality of reference members, and
   the processing unit obtains the second information based on detection results of the plurality of second detection units in a state in which the different reference members are selected from the plurality of reference members.

7. The apparatus according to claim 5, wherein
   the plurality of reference members comprise a first reference member and a second reference member, and
   the processing unit obtains the second information based on a result of measuring a shape of a predetermined portion on the surface of the object with reference to the first reference member and a result of measuring the shape of the predetermined portion with reference to the second reference member after moving the surface of the object in the scanning direction.

8. The apparatus according to claim 1, further comprising:
   an attitude detection unit configured to detect an attitude of the probe,
   wherein based on a detection result of the attitude detection unit, the processing unit controls the attitude of the probe so that the probe is maintained in a target attitude.

9. The apparatus according to claim 1, wherein the plurality of ranges include a range within which the same reference member is selected for each of the plurality of detection units and a range within which different reference members are selected for at least two of the plurality of detection units.

10. The apparatus according to claim 9, wherein the plurality of ranges further include a range within which no reference member is selected for one of the plurality of detection units.

11. The apparatus according to claim 1, wherein the plurality of detection units are arranged to be spaced apart in the scanning direction to be able to select one of the plurality of reference members for at least one of the plurality of detection units.

12. The apparatus according to claim 11, wherein
the plurality of reference members are arranged to be spaced apart in the scanning direction, and
a gap between the plurality of detection units is wider than a gap between the plurality of reference members.

13. A method of measuring a shape of a surface of an object using a probe scanned on the surface of the object, a plurality of reference members arranged in a scanning direction of the probe, and a plurality of detection units provided at different positions of the probe in the scanning direction and each configured to detect a distance from a reference member which has been selected from the plurality of reference members in accordance with a position of the probe in the scanning direction, the method comprising:
obtaining shape information of the surface of the object by obtaining position information of the probe based on at least one of detection results of the plurality of detection units while scanning the probe,
wherein in the obtaining, the detection result to be used to obtain the position information among the detection results of the plurality of detection units is changed in accordance with a range within which the probe is arranged, among a plurality of ranges obtained by partitioning a scanning range of the probe in the scanning direction, and
a combination of reference members respectively selected for the plurality of detection units is different in each of the plurality of ranges.

* * * * *